United States Patent [19]
van Bonn et al.

[11] Patent Number: 5,480,570
[45] Date of Patent: Jan. 2, 1996

[54] LOW COERCIVE IRON OXIDE PIGMENTS AND A PROCESS FOR THEIR PREPARATION

[75] Inventors: Karl-Heinz van Bonn, Moers; Hendrik Kathrein, Jüchen-Aldenhoven; Gerhard Franz, Krefeld, all of Germany

[73] Assignee: Toda Kogyo Corp., Hiroshima, Japan

[21] Appl. No.: 254,471

[22] Filed: Jun. 6, 1994

Related U.S. Application Data

[63] Continuation of Ser. No. 17,266, Feb. 12, 1993, abandoned.

[30]   Foreign Application Priority Data

Feb. 25, 1992 [DE] Germany ............ 42 05 634.9

[51] Int. Cl.⁶ ............ C01G 49/02; H01F 1/10; H01F 1/11
[52] U.S. Cl. ............ 252/62.56; 252/62.62; 106/456; 106/459; 106/425; 106/480; 428/403
[58] Field of Search ............ 252/62.56, 62.62; 427/127, 128, 131, 215; 106/456, 459, 425, 480; 428/403

[56]   References Cited

U.S. PATENT DOCUMENTS

| | | | |
|---|---|---|---|
| 3,931,025 | 1/1976 | Woditsch et al. | 252/62.62 |
| 3,974,079 | 8/1976 | Woditsch et al. | 252/62.56 |
| 4,066,565 | 1/1978 | Sasazawa et al. | 252/62.56 |
| 4,741,921 | 5/1988 | Kitaoka et al. | 252/62.56 |
| 4,923,519 | 5/1990 | Rodi et al. | 428/403 |
| 5,041,307 | 8/1991 | Koyama et al. | 252/62.56 |
| 5,183,709 | 2/1993 | Schwab et al. | 252/62.51 |

FOREIGN PATENT DOCUMENTS 61-252605  11/1986  Japan ............ 252/62.62

OTHER PUBLICATIONS

Magnetic Recording Handbook, pp. 1034–1035, 1082.

*Primary Examiner*—C. Melissa Bonner
*Attorney, Agent, or Firm*—Connolly & Hutz

[57]   ABSTRACT

Cobalt coated, needle shaped berthollide iron oxide pigments are disclosed which have a core of the composition $(Fe_x^{2+}, Fe_2^{3+})O_{3+x}$ wherein $0.3<x<0.75$, optionally also including an intermediate coating of Zn-containing benhollide between the core and the cobalt coating. The pigments are prepared by first coating the core with berthollide and a soluble zinc compound, followed by coating with a cobalt compound.

2 Claims, No Drawings

LOW COERCIVE IRON OXIDE PIGMENTS AND A PROCESS FOR THEIR PREPARATION

This application is a continuation of application Ser. No. 08/017,266 filed on Feb. 12, 1993, now abandoned.

The present invention relates to cobalt coated, needle-shaped berthollide iron oxide pigments consisting of an iron oxide core having the composition $(Fe_x^{2+}, Fe_2^{3+})O_{3+x}$ wherein $0.3<x<0.75$ and to a process for their preparation.

γ-$Fe_2O_3$ Pigments are used for magnetic signal recording, inter alia in audio tapes of operating point I, also known as IEC I, in which the coercive field strengths are in the usual range of from 30 to 37 kA/m. The requirements for high quality operating point-I pigment as regards the dynamics are constantly increasing. Products having distinctly higher saturation magnetisations are therefore desirable. Saturation magnetisations >102 mWb.m/kg can quite easily be obtained with FeO-rich berthollide iron oxide pigments having the composition $FeO_x$ in which $1.33<X<<1.5$ but these pigments have the disadvantage of significantly less favourable printing attenuation properties compared with iron oxide pigments which are free from FeO.

Although the printing attenuation properties of ferrites can be significantly improved by suitable measures, for example by a tempering of the ferrites as described in U.S. Pat. No. 3,974,079, other properties of the magnetic pigment powder are then deleteriously affected. Thus not only is the coercive field strength reduced but a deterioration in the noise factor is produced as another important change which is undesirable for acoustic transmission.

It is therefore an object of the present invention to produce an FeO-rich magnetic pigment powder which does not have the above-described disadvantages of the magnetic iron oxide pigments known in the art.

A material which fulfils these requirements has now unexpectedly been found. The present invention relates to cobalt coated, needle-shaped berthollide iron oxide pigment consisting of an iron oxide core having the composition $(Fe_x^{2+}, Fe_2^{3+})O_{3+x}$ wherein $0.3<x<0.75$, in which the quantity of cobalt is from 0.1 to 1.5% by weight, based on the core.

In a preferred embodiment, the magnetic iron oxide pigments according to the invention are characterised in that a coating containing a benhollide Zn-containing compound having the composition $(Fe_x^{2+}, Fe_2^{3+})O_{3+x}$ wherein $0.3<x<0.75$ and a Zn content of from 0.1 to 2% by weight, preferably from 0.5 to 1.2% by weight, based on the core, is present between the cobalt coating and the iron oxide core.

The iron oxide pigments according to the invention may also be defined by their characteristic magnetic values.

Thus when the specific saturation magnetisation is > 102 mWb.m/kg and the coercive field strength is from 30 to 37 kA/m, the printing attenuation measured after incorporation of the pigments into an audio tape according to DIN IEC 94 Part 5 is greater than 50 dB, based on a magnetic layer thickness of 12 μm and an ash content of 11 g/m².

It must be regarded as surprising that the problem could be solved with the iron oxide pigments according to the invention since cobalt coated IEC 1-pigments have hitherto only been prepared on the basis of γ-$Fe_2O_3$ cores as it was generally held that the incorporation of $Fe^{2+}$ as well as the incorporation of $Co^{2+}$ in berthollide iron oxides would impair the printing attenuation properties (C. Denis Mee, Eric D. Daniel, Magnetic Recording Handbook, Part 1, Technology and Applications, McGraw-Hill, New York 1990, page 1035).

The invention also relates to a process for the preparation of the iron oxide pigments according to the invention. In this process, a magnetic berthollide iron oxide core material having the composition $(Fe_x^{2+}, Fe_2^{3+})O_{3+x}$ wherein $0.3<x<0.75$ is first coated with a berthollide compound of the required composition with the addition of a soluble zinc compound in an amount of from 0.1 to 2% by weight, preferably from 0.5 to 1.2% by weight, based on the core and calculated as Zn, and then coated in the second step with a cobalt compound.

Coating of the core material is preferably carded out, as described in U.S. Pat. No. 4,923,519, by first applying a ferrite layer to the surface of the pigment and then adding cobalt, which diffuses into the ferrite layer at elevated temperatures.

The iron oxide core material is dispersed in water for this purpose and an iron salt solution and a zinc salt solution, preferably the sulphates, are added and these salts are then precipitated by the addition of an alkali solution.

Application of the first layer is preferably carded out under oxidizing conditions, preferably by using air. The first coating of the core material with the berthollide compound with the addition of the soluble zinc compound may be carried out by known processes. Particularly good results are obtained when this preliminary coating is applied in an alkaline medium. The subsequent steps of the process may be carded out as follows: After application of the first layer, oxidation is carried out by the introduction of air at temperatures of about 60° C. After formation of the ferrite layer, the cobalt salt is added to the pigment suspension under a nitrogen atmosphere at 90° C. The coating with cobalt is preferably carded out using a soluble Co salt, preferably $COSO_4$, in an alkaline medium.

The pigment suspension is worked up by filtration, washing, drying and compacting, preferably in a roller mill.

Subsequent processing of the magnetic pigment produced according to the invention to form a machine tape results in significantly higher printing attenuation values than those obtained for a ferrite without cobalt coating and the pigment at the same time meets present-day requirements.

The preparation of the pigments according to the invention and the production of the tape is described below by way of example without the invention being thereby limited.

To determine the properties of the iron oxide pigments according to the invention in the tape, 165 g of the magnetic iron oxide pigment are introduced into a lacquer based on Vinylite VAGH and Estane 5714 so that the volumetric proportion of the magnetic pigment on the machine tape amounts to about 45%. The magnetic lacquer dispersion is ground in a pearl mill for 3 hours and then applied in a thin layer to a film of polyester with the aid of a coating machine, aligned in a homogeneous magnetic field of 79.6 kA/m and hardened at 100° C. The following parameters are determined after calendering and cutting of the tape:

| | |
|---|---|
| $_IH_C$ | coercive field strength determined at 398 kA/m |
| KD | copy damping determined according to DIN IEC 94 Part 5 at a magnetic tape layer thicknes of 12 μm and an ash content of 11 g/m² |
| MOL | depth modulation ⎫ determined according to DIN |
| SOL | height modulation ⎬ IEC 94 Part 5 |
| IEC | reference tape for operating point I is R 723 DG (Manufacturer: BASF AG). |

EXAMPLE 1

An α-FeOOH precursor prepared according to U.S. Pat. No. 3,931,025 by the precipitation of a solution consisting of $FeSO_4$, $ZnSO_4$ and $Na_3PO_4$ with sodium hydroxide solution followed by oxidation with air is tempered in air at 750° C. for 30 minutes. After the reduction with moist hydrogen at 400° C. for 105 minutes, the substance is passivated with an air/nitrogen mixture at 180° C. Subsequent after-tempering under a nitrogen atmosphere results in a magnetic ferrite pigment having a specific surface area according to BET of 26 m²/g, determined by the $N_2$-1-point method (DIN 66 131).

400 g of this material are dispersed in 1600 ml of water by means of a Kotthoff mixing siren and then ground in a corundum disc mill and transferred to a reaction vessel equipped with stirrer. 1250 ml of water, a solution of 94.3 g of $FeSO_4 \cdot 7H_2O$ and 10.6 g of $ZnSO_4 \cdot 7H_2O$ in 500 ml of water and 450 ml of NaOH solution (742 g of NaOH/l) are then added. After the suspension has been heated to 60° C., the FeO content is adjusted to 22–24% by oxidation with air within one hour. After the air has been replaced by nitrogen, a solution of 19.1 g of $CoSO_4 \cdot 7H_2O$ in 200 ml of water is added. The suspension is then heated to 95° C. and stirred for 3 hours. The suspension is worked up by filtration, washing and drying at 30° C. in a circulating air drying cupboard. The tamped density according to DIN 787/11 is adjusted to 0.9–1.0 g/cm³ by compacting in a roller mill.

The magnetic pigment prepared as described above is incorporated in a magnetic lacquer formulation having the following composition:

| | % by weight |
|---|---|
| Magnetic pigment | 24.58 |
| Solution A: | |
| Tetrahydrofuran | 27.19 |
| Vinylite VAGH (1) | 3.07 |
| Pure lecithin (2) | 0.92 |
| Solution B: | |
| Tetrahydrofuran | 40.76 |
| Estane 5714 (3) | 3.07 |
| Stearic acid (4) | 0.11 |
| Lauric acid (4) | 0.3 |

(1) Union Carbide (polyvinyl chloride copolymer: Molecular weight = 23 100 g/mol; density = 1.39 g/cm³)
(2) Lucas Meyer (Trade name: Lipopur(R))
(3) B. F. Goodrich (Polyurethane: density = 1.11 g/m³)
(4) Unichem, Emmerich.

Solutions A and B are prepared separately from one another. When clear solutions of A and B have been obtained, they are mixed together and the magnetic pigment is added with thorough mixing.

After 3 hours' grinding in a pearl mill, an audiotape 3.81 mm in width is produced by the process mentioned above and tested for the machine tape data shown in Table 1.

COMPARISON EXAMPLE 1

The same α-FeOOH precursor as that used in Example 1 is tempered in air at 750° C. for 30 minutes, reduced with moist hydrogen at 400° C. for 105 minutes and then oxidized in air at 280° C. to γ-$Fe_2O_3$. A pigment have a specific surface area of 27 m²/g, determined by the $N_2$-1 point method, is obtained. This pigment is subsequently processed into a magnetic tape as described in Example 1.

COMPARISON EXAMPLE 2

The γ-$Fe_2O_3$ pigment described in Comparison Example 1 is coated with cobalt ferrite as in Example 1 and cast to form a tape as in Example 1.

COMPARISON EXAMPLE 3

The ferrite used as core for the cobalt coating in Example 1 is worked up into a tape as described in Example 1.

TABLE 1

| Example | Core | FeO % | BET* m²/g | Mr/p mWb. m/kg | IHc kA/m | Ms/p mWb. m/kg | Layer thickness μm | Volume-filling factor % | IHc kA/m |
|---|---|---|---|---|---|---|---|---|---|
| 1 | Co-ferrite | 18.4 | 26 | 49.2 | 33.8 | 106.3 | 4.7 | 44.8 | 33.8 |
| V1 | γ-$Fe_2O_3$ | — | 27 | 42.1 | 28.2 | 88.0 | 4.8 | 43.4 | 28.5 |
| V2 | CO-γ-$Fe_2O_3$ | 3.5 | 29 | 48.5 | 31.6 | 97.2 | 4.9 | 42.5 | 31.7 |
| V3 | Ferrite | 21.8 | 26 | 53.9 | 34.2 | 102.7 | 5.4 | 41.3 | 29.7 |

| Example | Br/Bs 1 kOe | OR | KD dB | MOL dB | SOL dB |
|---|---|---|---|---|---|
| 1 | 0.885 | 2.55 | 50.5 | −0.5 | 4.0 |
| V1 | 0.885 | 2.55 | 53.5 | −0.9 | −1.5 |
| V2 | 0.905 | 2.65 | 51.5 | −1.7 | 1.3 |
| V3 | 0.87 | 2.20 | 48.0 | −0.7 | 1.7 |

*specific surface area according to DIN 66 133 ($N_2$-1-point method)

What is claimed is:

1. Cobalt coated, needle-shaped berthollide iron oxide pigments comprising:

an iron oxide core having the composition $(Fe_x^{2+}, Fe_2^{3+})O_{3+x}$, wherein $0.3<x<0.75$, a cobalt coating, the quantity of cobalt being from 0.1 to 1.5% by weight based on the weight of the core, and a berthollide Zn-containing compound coating composed of a berthollide compound having the composition $(Fe_x^{2+}, Fe_2^{3+})O_{3+x}$, wherein $0.3<x<0.75$, and Zn, the berthollide Zn-containing compound coating being situated between the cobalt coating and the iron oxide core, the quantity of Zn in said coating being from 0.1 to 2% by weight based on the weight of the core, said cobalt coated, needle-shaped berthollide iron oxide pigments having characteristics that when the specific saturation magnetization is greater than 102mWb.m/kg and the coercive field strength is from 30 to 37 kA/m, the printing attenuation measured after incorporation of the pigments in an audio tape according to DIN IEC 94 Part 5 is greater than 50 dB, based on a magnetic layer thickness of 12 μm and an ash content of 11 $g/m^2$; and produced by the process comprising:

dispersing the iron oxide core material in water to form a dispersion;

adding an aqueous iron salt solution and an aqueous zinc salt solution to the dispersion;

adding an alkaline solution to the dispersion to precipitate the iron and zinc salts, thereby forming the berthollide Zn-containing compound coating on the iron oxide core material;

introducing air to the dispersion; and then coating the obtained material with a cobalt compound using a soluble cobalt salt in alkaline medium under a nitrogen atmosphere.

2. Pigments as claimed in claim 1, wherein the quantity of Zn in the berthollide Zn-containing compound is 0.1 to 1.2% by weight based on the weight of the core.

* * * * *